United States Patent [19]

Ando et al.

[11] Patent Number: 4,682,228
[45] Date of Patent: Jul. 21, 1987

[54] COLOR VIDEO DISPLAY APPARATUS FOR VEHICLES

[75] Inventors: Noriyoshi Ando; Hajime Mikuni; Mitsuru Matsunaga, all of Kariya; Naoki Horie, Chita; Tomohisa Kishigami, Kariya, all of Japan

[73] Assignee: Nippondenso Co., Ltd., Kariya, Japan

[21] Appl. No.: 765,525

[22] Filed: Aug. 14, 1985

[30] Foreign Application Priority Data

Aug. 29, 1984 [JP] Japan .............................. 59-181562

[51] Int. Cl.[4] ............................................. H04N 5/58
[52] U.S. Cl. .................................... 358/161; 358/29; 340/703
[58] Field of Search .................... 358/161, 93, 27, 29, 358/169, 21 R; 340/703, 725, 723, 720, 789, 793; 250/214 AL

[56] References Cited

U.S. PATENT DOCUMENTS 3,315,029  4/1967  Suhrmann ..................... 358/161 X
4,514,727  4/1985  Van Antwerp ................. 358/161 X Primary Examiner—James J. Groody
Assistant Examiner—Victor R. Kostak
Attorney, Agent, or Firm—Cushman, Darby & Cushman

[57] ABSTRACT

A color video display apparatus for vehicles detects a light or dark condition outside a vehicle to perform a variable gain control on a circuit for amplifying blue, green and red video signals. In response to the dark condition outside the vehicle, the amplification factor of the red video signal is increased relative to those of the blue and green video signals.

7 Claims, 3 Drawing Figures

COLOR VIDEO DISPLAY APPARATUS FOR VEHICLES

BACKGROUND OF THE INVENTION

The present invention relates to a color video display apparatus for vehicles which is mounted in the vehicle compartment to provide various displays.

For the color balance of a color CRT, it has been the practice in the past to adjust the intensity ratios of the emitted R, G and B colors and thereby to set the white color to a reference value. Then, taking the sum of the emitted R, G and B colors forming the reference color as "1", the intensities of the emitted colors have been varied within this range to produce any desired colors.

Such reference white color has differed depending on the preference of people, the kind of the outdoor light during the observation etc., and therefore the reference white color having a color temperature of 6,500° K. has been used for a long time in Europe and America, while in Japan the reference white color has been specified as a color temperature of 8,300° to 10,000° K.

Considering now a color CRT for use in a vehicle, there are instances where the eyes of an observer are adapted to the indirect rays of the sun in the daytime and where the eyes are adapted for the scotopic vision in the nighttime. Therefore, if the display on a color CRT having the white set to a color temperature of 8,300° K. as mentioned previously is observed, there is an inconvenience that the blue is emphasized considerably and the red is caused to appear excessively dark. This will be described with reference to the spectral luminous efficiency curves of man shown in FIG. 2. During the light hours of day the human eyes have a relative luminous efficiency under the conditions of photopic vision in the Figure and the color balance of the ordinary color CRT is effected in accordance with such human luminous efficiency. However, during the hours from twilight to night the relative luminous efficiency of the human eyes is shifted toward the shorter wavelengths as shown under the conditions of scotopic vision in the FIG. 2. As a result, the color balance of the color CRT effected as mentioned previously becomes such that the blue and bluish green colors are excessively intensified and the yellow, orange and red colors are caused to appear extremely dark due to a change in the luminous efficiency of the human eyes.

SUMMARY OF THE INVENTION

The present invention has been made to overcome the foregoing deficiencies in the prior art, and it is an object of the invention to provide an improved display apparatus for vehicles which is capable of providing color displays with stable color tones irrespective of the light or dark condition outside the vehicle.

In accordance with the invention there is thus provided a color video display apparatus for a vehicle including light/dark detecting means for detecting the light or dark condition outside the vehicle, and control means for relatively increasing the amplification factor of red video signals over that of blue video signals in an amplifier circuit when the light/dark detecting means detects that the outside of the vehicle is dark.

Thus, in accordance with the present invention, by virtue of the fact that the amplification factor of red video signals is increased relative to that of blue video signals when the outside of the vehicle is dark, there are great effects that there is the effect of eliminating the inconvenience of causing the blue color to appear excessively intense as compared with the red color during the night driving and that color displays with stable color tones can be provided in both the daytime and the nighttime.

DESCRIPTION OF THE PREFERRED EMBODIMENTS

Figure 1:
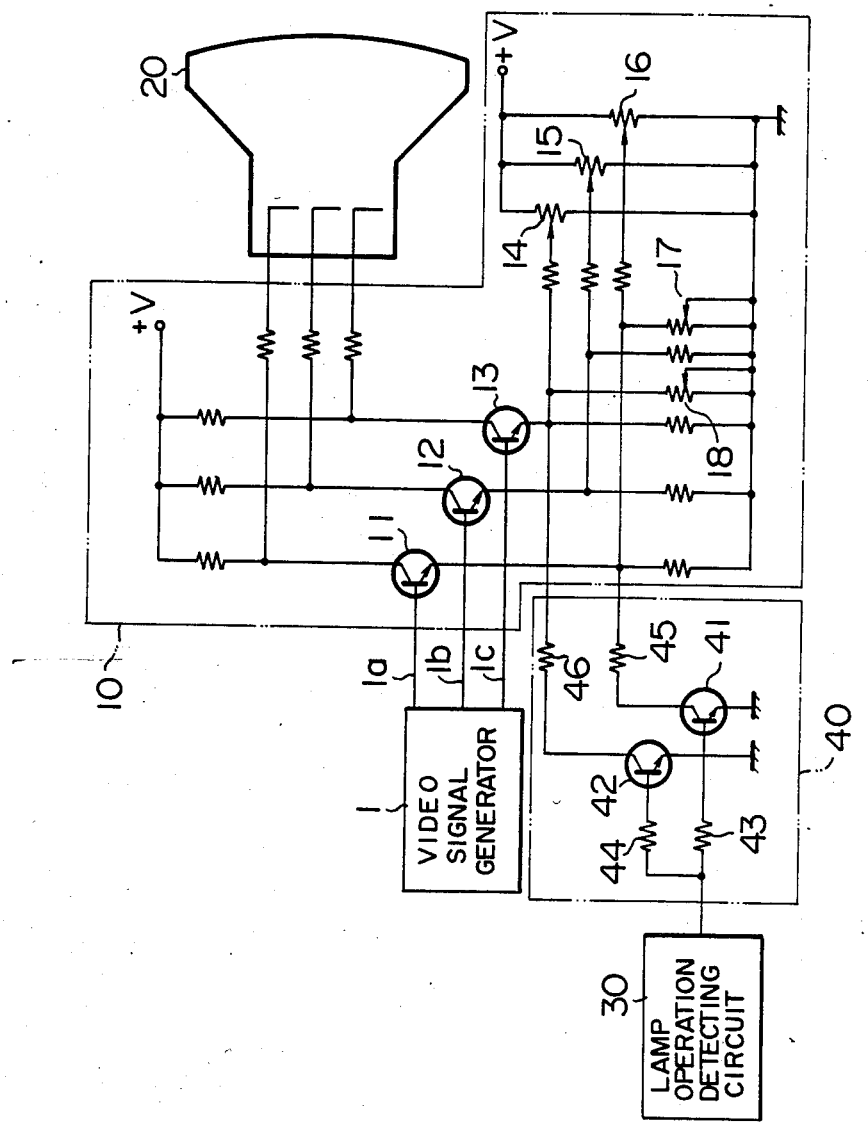
FIG. 1 is an electric wiring diagram showing an embodiment of the invention.
Figure 2:
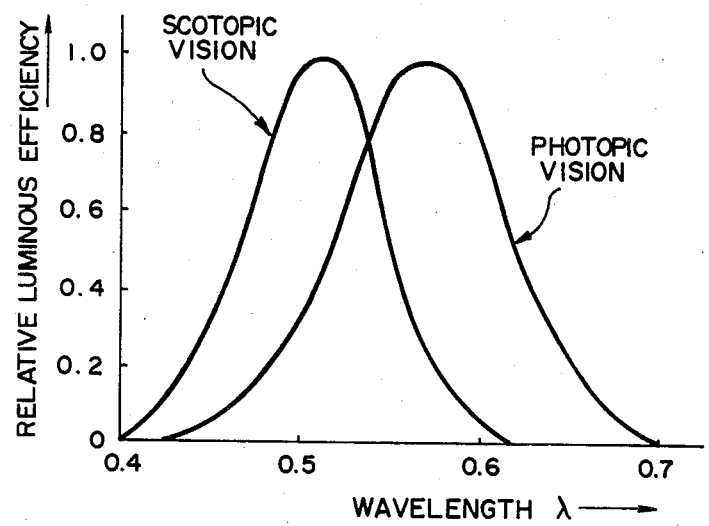
FIG. 2 is a diagram showing a relative luminous efficiency of a human eye.

The present invention will now be described in greater detail with reference to the illustrated embodiment. FIG. 1 is an electric wiring diagram of the embodiment. In the Figure, numeral 1 designates a video signal generator for generating blue, red and green video signals at terminals 1a, 1b and 1c, respectively, to provide color displays, 10 an amplifying circuit for amplifying the blue, red and green video signals from the video signal generator 1, and 20 a color CRT for providing a color display in response to the video signals amplified by the amplifying circuit 10.

In the amplifying circuit 10, numerals 11, 12 and 13 designate transistors for respectively amplifying the blue, red and green video signals from the video signal generator 1 and applying the amplified voltages from their collectors to the cathodes of the color CRT 20. Numerals 14, 15 and 16 designate cut-off adjusting variable resistors for the transistors 11, 12 and 13, respectively, and 17 and 18 variable resistors for respectively adjusting the amplification factors of the transistors 11 and 13 or the amplification factors of the blue and green video signals.

Numeral 30 designates a lamp operation detecting circuit for detecting the operated condition of a tail lamp operating switch so that a high level signal is generated in response to the detection of the nonoperated condition of the tail lamp operating switch as in the daytime and a low level signal is generated in response to the detection of the operated condition of the tail lamp operating switch as in the nighttime. Numeral 40 designates a control circuit responsive to a signal from the lamp operation detecting circuit 30 to vary the amplification factors of the transistors 11 and 13 in the amplifying circuit 10. The control circuit 40 includes transistors 41 and 42 and resistors 43, 44, 45 and 46 and the resistors 45 and 46 are respectively connected to the emitter of the transistors 11 and 13.

With the construction described above, the operation of this embodiment is as follows.

Now, during the daytime when the tail lamp operating switch is off, the output from the lamp operation detecting circuit 30 goes to the high level so that the transistors 41 and 42 are turned on in the control circuit 40. Thus, the resistors 45 and 46 are respectively connected in parallel with the emitter of the transistors 11 and 13 of the amplifying circuit 10 and in this condition of transistors 11 and 13 amplify the respective video signals from the video signal generator 1. The color CRT 20 provides a color display in response to the video signals amplified by the transistors 11, 12 and 13.

In this case, the resistance values of the variable resistors 17 and 18 are adjusted such that the color tones of the display by the color CRT 20 are adapted to suit the photopic vision (the daytime).

On the other hand, during the night driving when the tail lamp operating switch is on, the output from the lamp operation detecting circuit 30 goes to the low level so that the transistors 41 and 42 are turned off in the control circuit 40. This eliminates the parallel connection of the resistors 45 and 46 with the emitters of the transistors 11 and 13 of the amplifying circuit 10 so that the collector voltages of the transistors 11 and 13 are increased and their amplification factors are decreased. As a result, the amplification factors of the blue and green video signals are decreased and the amplification factor of the red video signal is increased relatively. When this occurs, the display color tones of the CRT 20 are adapted to the scotopic vision (the nighttime) thus providing a color display with stable color tones.

Figure 3:
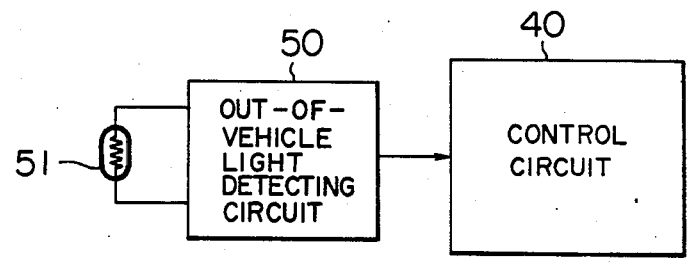
FIG. 3 is a block diagram showing another embodiment of the light/dark detecting means used in the embodiment of FIG. 1.

While, in the above-described embodiment, the light/dark detecting means includes the lamp operation detecting circuit for detecting the operated condition of the tail lamp operating switch, a circuit including a sensor for detecting the brightness outside the vehicle may be used to detect the light or dark condition outside the vehicle. FIG. 3 shows such an example, wherein 40 and 50 designate control circuit and out-of-vehicle light detecting circuit, a light sensor 51 is provided at the instrument panel so as to detect brightness in the vehicle compartment. It can detect brightness outside the vehicle indirectly. Also, the desired light/dark detection may be effected in response to a lamp-on signal from a device for automatically turning on the tail lamps or the like in accordance with the brightness outside the vehicle.

Further, while the amplification factors of both blue and green video signals are decreased so as to relatively increase the amplification factor of red video signals, the amplification factor of red video signals may be increased without varying the amplification factors of blue and green video signals.

Further, while color displays are provided with the blue, green and red colors, it is possible to use a simplified type which provides color displays with the blue and red colors.

Further, while the display means includes the CRT, the display means may be composed of a dot matrix-type liquid crystal display unit or the like.

We claim:

1. A color video display apparatus for a vehicle comprising:
   video signal generator means for generating at least blue and red video signals for providing a color display;
   amplifying means for amplifying said video signals from said video signal generator means, said amplifying means including gain adjusting means for varying an amplification factor of at least one of said video signals;
   display means for producing said color display with said video signals amplified by said amplifying means;
   light/dark detecting means for detecting one of a light and dark condition outside of said vehicle; and
   control means, responsive to said detecting means detecting that the outside of said vehicle is dark, for controlling the operation of said gain adjusting means such that the amplification factor of said red video signal is increased relative to that of said blue video signal in said amplifying means to maintain stable color tones in said color display.

2. An apparatus according to claim 1, wherein said light/dark detecting means comprises sensor means for detecting an out-of-vehicle light, and out-of-vehicle light detecting means, responsive to an output signal of said sensor means, for generating a signal indicative of said dark condition outside said vehicle.

3. An apparatus according to claim 1, wherein said light/dark detecting means comprises a lamp operation detecting circuit.

4. An apparatus according to claim 1, wherein said video signal generator means generates red, blue and green video signals, and wherein said amplifying means is also for decreasing the amplification factors of said blue and green video signals without varying that of said red video signal.

5. An apparatus according to claim 4, wherein said amplifying means comprises a plurality of transistors, each being adapted to amplify one of said red, blue and green video signals, and gain adjusting means including a plurality of resistors each being adapted to control the gain of one of said transistors, and wherein said control means comprises a plurality of shunt resistors and switch means each being responsive to said light/dark detecting means detecting a dark condition to shunt one of said gain control resistors adapted respectively to amplify said blue and green video signals.

6. An apparatus according to claim 4, wherein said gain adjusting means includes means for adjusting the amplification factors of said blue and green video signals in response to a light condition outside said vehicle.

7. An apparatus as in claim 1 wherein said control means includes a resistor disposed so as to affect an amplification of said amplifying means, and means for selectively providing a current path to said resistor.

* * * * *